United States Patent [19]

Beese

[11] Patent Number: 4,796,380

[45] Date of Patent: Jan. 10, 1989

[54] FISHHOOK HOLDER

[76] Inventor: Howard Beese, 111 Maroy Dr., South Amherst, Ohio 44001

[21] Appl. No.: 59,626

[22] Filed: Jun. 8, 1987

[51] Int. Cl.$^4$ ............................................. A01K 97/06
[52] U.S. Cl. ...................................................... 43/57.1
[58] Field of Search ...................... 43/57.1; 206/315.11

[56] References Cited

U.S. PATENT DOCUMENTS

| | | | |
|---|---|---|---|
| 1,365,111 | 1/1921 | Lawrence | 43/57.1 |
| 2,703,467 | 3/1955 | Shepherd | 43/57.1 |
| 2,932,118 | 4/1960 | Jend | 43/57.1 |
| 2,966,001 | 12/1960 | Sader . | |
| 3,141,258 | 7/1964 | Mayer | 43/57.1 |
| 3,755,957 | 9/1973 | Neuman . | |
| 3,800,456 | 4/1974 | Rowe | 43/57.1 |
| 3,940,873 | 3/1976 | Lawless | 43/57.1 |
| 4,015,361 | 4/1977 | O'Reilly | 43/57.1 |
| 4,468,882 | 9/1984 | Marusak | 43/57.1 |

*Primary Examiner*—Kurt Rowan
*Attorney, Agent, or Firm*—Gustalo Nunez

[57] ABSTRACT

Fishhook holding means comprising a circumferentially shaped member having two identical opposing faces. The opposing faces define a channel which gradually narrows from the extreme edge of said member radially to the center of said member. The fishhook holding means can be attached to the fisherman's belt, hat or even to the fishing rod. The fishhook holder safely retains any type of fish hook, regardless of wire diameter. The fishhook is placed in the fishhook holding member simply by placing the fishhook between the two interior opposing faces and pulling the fishhook radially towards the axis of said fishhook member while simultaneously rotating the fishhook.

1 Claim, 1 Drawing Sheet

FISHHOOK HOLDER

BACKGROUND OF THE INVENTION

This invention is directed to apparatus for safely engaging and retaining fishhooks. The fishhooks thus do not become entangled when transporting the hooks. It is well known that fishermen carry a multitude and variety of fishhooks, depending on where and what they are fishing for. Carrying and transporting fishhooks without the use of the apparatus described herein can cause difficulties for the fisherman. The fishhooks, unless separated somehow, become entangled with each other, resulting in some fishermen becoming injured from the hooks and barbs when attempting to disentangle the fishhooks. Further, the fishhooks, unless carefully transported, can become damaged. The configuration of the fishhook retaining apparatus is such that it can be carried in one's pocket or purse without posing any problems and without causing any damage to the pocket or purse.

DESCRIPTION OF THE PRIOR ART

In Sader, U.S. Pat. No. 2,966,001 there is described a device for carrying fishhooks. It is comprised of two plastic disks which are held together in assembled relation by a central rivet. There is a groove formed on each disk, and the disks are biased toward each other by a spring shaped star wheel. The fishhook is placed within the formed groove and retained there by the two biased disks.

Lawrence, U.S. Pat. No. 1,365,111 discloses a fishhook holder designed in the manner of a holster. Contained in the holster is an extending projection on which is placed the fishhook. The holder is then folder over and about the fishhook.

U.S. Pat. No. 3,755,957 issued to Neuman for a fishhook holding system discloses a holding device comprising a pair of moveable opposing buttons held together by a U-spring spring applying pressure to the two outside surfaces of the buttons. The fishhook is passed between the two interior faces of the buttons and pulled toward the center axis until the fishhook comes under the effect of the pressure applied by spring biasing members.

SUMMARY OF THE INVENTION

It is an objective of the present invention to provide a fishhook holding device which is easy to use, which can be used in a variety of environments, and which is simple in construction and inexpensive to manufacture. The invention described herein comprises a device which has a pair of interiorly opposing faces. The deposing faces define a circumferential chamber which narrows radially inwardly toward the center of the interior opposing faces.

The fishholding device contemplated herein generally appears to be a pair of circular disks held together at their centers. However, the fishholding device is one integral unit manufactured by well known methods such as by injection molding techniques. The fishhook is inserted into the circumferential channel and pulled toward the center of the opposing disks; simultaneously, the fishhook is rotated about the center of the fishholding device. As the fishhook approaches the center portion of the disks, the channel narrows and the fishhook makes contact with the opposing interior wall surfaces. The downwardly rotational movement given to the fishhook results in the fishhook being placed in a position as close as possible to the center of the fishhook holder, resulting in increased pressure being applied to the fishhook by the opposing interior surfaces. The fishhook holding device is now ready for carrying.

BRIEF DESCRIPTION OF THE INVENTION

These and other objects and features of the invention are more readily understood by the consideration of the following detailed description taken with the accompanying drawings, in which.

DESCRIPTION OF SPECIFIC EMBODIMENTS

Figure 1:
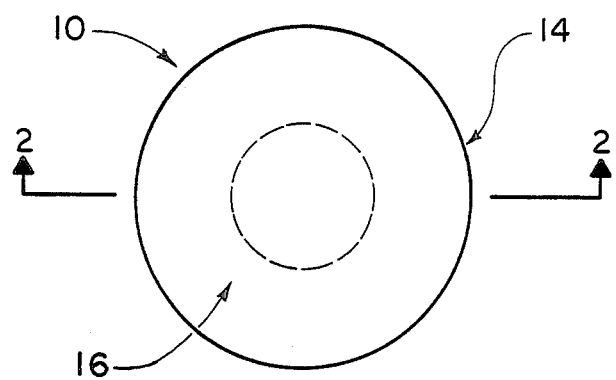
FIG. 1 is a side plan view of the fishhook holding device.

Referring now to the particular embodiments of the invention shown in the drawings by way of example only, FIG. 1 shows the fishhook holder generally at 10 and having internal opposing faces 12 and 14 and external wall surfaces 16 and 18. Although FIG. 1 illustrates the fishhook holder as circular in configuration, the invention need not be restricted to such a shape inasmuch as the fishhook holder 10 can be oblong, eliptical or rectangular in shape and function in the manner contemplated by this invention.

Figure 2:
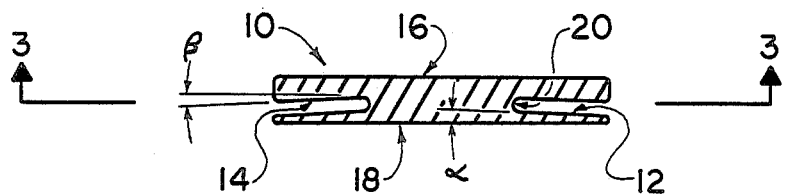
FIG. 2 is a side sectional view taken along lines 2—2.

Referring now to FIG. 2, it can be seen that the internally opposing wall surfaces 12 and 14 are angularly disposed with respect to the external wall surfaces 16 and 18. It has been found that the fishhook holder 10 functions very well when the angle $\alpha$ is 10° and angle $\beta$ is 15°. Again, these angles are cited by way of example only and are by no means meant to restrict the fishhook holder 10 to those angles. The internal opposing wall surfaces converge at 20. It can be seen that the internal opposing wall surfaces define an angular channel which narrows in a downwardly direction at the point of convergence 20.

The fishhook holder 10 may be manufactured from materials such as rubber and plastic. An ideal method for the manufacture is by well known mold injection means.

Figure 3:
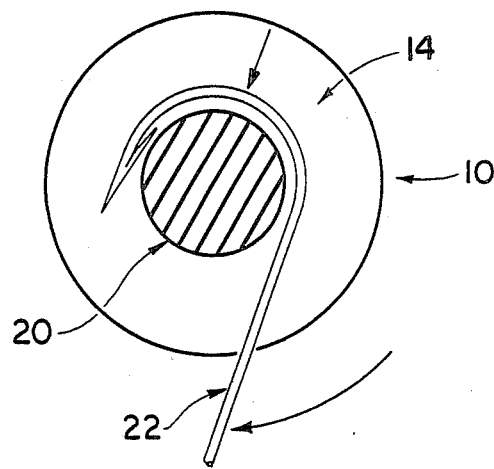
FIG. 3 is a side view, partially in cross-section taken along lines 3—3.

The operation and use of the fishhook holder 10 will now be explained with the use of FIGS. 2 and 3. A fisherman places the fishhook 22 into the channel formed by the internal opposing wall surfaces 12 and 14 and pulls toward the point of convergence 20. As the fishhook approaches the point of convergence 20, the channel gets narrower to such an extent that the fishhook 22 makes contact with the internal opposing wall surfaces 12 and 14. The resilient nature of the material from which the fishhook is made permits the fishhook to be pulled to the convergent point 20 to the extent that the internal opposing wall surfaces now apply biasing force to the fishhook 22 such that the biasing force along is sufficient to retain the fishhook 22 in place. It has been found that if the fisherman would rotate the fishhook 22 as shown in FIG. 3, while pulling the fishhook 22 toward the convergent point 20, the fishhook 22 makes even greater penetration toward the convergent point 20 which greatly increases the hold that the internal opposing wall surfaces 12 and 14 have on the fishhook 22. Thus the fishhook 22 is now secured by the fishhook holder 10. The fishhook holder 10 can be carried by the fisherman in his pocket, his tackle box or by other similar carrying means without the fishhooks becoming entangled.

Also, the fishhook holder can be provided with a well known pocket spring clip by any number of popular adhesive means on either of the outside wall surfaces 16 and 18 thus allowing the fisherman to carry an assortment of fishhooks on his pocket edges or even on his hat, if desired.

Also, an opening may be placed at the center of the fishhook holder 10 thus allowing the fisherman to tie a group of fishhook holders with a connecting means such as a string or fishline.

An important feature of the invention is the manner in which the internal opposing wall surfaces are sloped, which results in greater retaining ability on the part of the fishhook holder 10.

Accordingly, while the invention has been described with particular reference to specific embodiments thereof in the interest of complete definiteness it will be understood that it may be embodied in a variety of forms diverse from those shown and described without departing from the spirit and scope of the invention as defined by the following claims.

What I claim is:

1. A fishhook holding device comprising a member having first and second exterior wall surfaces, and first and second opposing interior wall surfaces, wherein said first interior wall surface is angularly disposed with respect to said first exterior wall surface such that an angle $\alpha$ is thereby defined, wherein said second interior wall surface is angularly disposed with respect to said second exterior wall surface such that an angle $\beta$ is thereby defined, wherein said angles $\alpha$ and $\beta$ not necessarily being equal to each other, said first and second interior wall surfaces further defining a circumferential channel, said channel having its radial axis not parallel to said first and exterior wall surfaces, said member further having a central axis upon which said first and second interior wall surfaces converge, such that said circumferential channel narrows at the point of convergence, said first and second interior wall surfaces providing a yieldable surface area for retaining a fishhook when said fishhook is fixedly located near the point of convergence, said yieldable surface effectively eliminating the need for any outside biasing force.

* * * * *